United States Patent
Lan et al.

(10) Patent No.: US 12,072,787 B2
(45) Date of Patent: Aug. 27, 2024

(54) METHOD AND APPARATUS FOR TESTING CONTROL SOFTWARE BY INJECTING FAULT SIGNALS INTO A SIMULATION ENVIRONMENT, AND COMPUTER-READABLE STORAGE MEDIUM

(71) Applicant: CONTEMPORARY AMPEREX TECHNOLOGY CO., LIMITED, Fujian (CN)

(72) Inventors: Bin Lan, Fujian (CN); Xuming Wang, Fujian (CN); Deqiang Shi, Fujian (CN); Chunguang Ye, Fujian (CN); Runqi Wu, Fujian (CN); Jianfeng Guo, Fujian (CN); Chang Liu, Fujian (CN); Dongfei Zhang, Fujian (CN); Jianping Bai, Fujian (CN); Lang Yang, Fujian (CN); Xuan He, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/233,351

(22) Filed: Aug. 14, 2023

(65) Prior Publication Data
US 2024/0111661 A1 Apr. 4, 2024

Related U.S. Application Data

(63) Continuation of application No. PCT/CN2022/122400, filed on Sep. 29, 2022.

(51) Int. Cl.
*G06F 11/36* (2006.01)
*G05B 23/02* (2006.01)

(52) U.S. Cl.
CPC ...... *G06F 11/3664* (2013.01); *G05B 23/0256* (2013.01); *G06F 11/3688* (2013.01)

(58) Field of Classification Search
CPC .. G06F 11/36–11/3696; G05B 23/00–23/0297
See application file for complete search history.

(56) References Cited

U.S. PATENT DOCUMENTS 8,613,080 B2 * 12/2013 Wysopal ............... G06F 21/577
726/19
9,606,902 B2 * 3/2017 Hyodo ................. G06F 11/3688
(Continued)

FOREIGN PATENT DOCUMENTS

CN 109813999 A 5/2019
CN 111830930 A 10/2020
(Continued)

OTHER PUBLICATIONS

Swift, L.D., "An Enhanced Digital Power System Simulator for Education and Training", 1998 [retrieved on Jan. 31, 2024], pp. 217-287, ProQuest Dissertations and Theses Professional [online], Retrieved from: Dialog, ProQuest document ID: 304482611.*
(Continued)

*Primary Examiner* — Todd Aguilera
(74) *Attorney, Agent, or Firm* — XSENSUS LLP

(57) ABSTRACT

An embodiment of this application provides a method and apparatus for testing control software, and a computer-readable storage medium to reduce the time consumed in the simulation-based debugging and enhance efficiency. The method may include obtaining test information of a plurality of fault signals; and injecting, based on the test information of the plurality of fault signals, the plurality of fault signals into a simulation environment in sequence to obtain test results of the plurality of fault signals handled by the control software, where the simulation environment may be a simu-
(Continued)

lation environment of a control object of the control software.

10 Claims, 3 Drawing Sheets

(56) References Cited

U.S. PATENT DOCUMENTS

| | | | |
|---|---|---|---|
| 9,678,816 B2* | 6/2017 | Rugina | G06F 11/0793 |
| 10,387,231 B2* | 8/2019 | Papak | G06F 11/0709 |
| 2010/0218058 A1 | 8/2010 | Somasundaram et al. | |
| 2012/0072968 A1* | 3/2012 | Wysopal | G06F 21/577 |
| | | | 726/1 |
| 2014/0289564 A1* | 9/2014 | Rugina | G06F 11/0793 |
| | | | 714/38.1 |
| 2015/0121148 A1* | 4/2015 | Hyodo | G06F 11/3636 |
| | | | 714/38.1 |
| 2018/0060202 A1* | 3/2018 | Papak | G06F 11/3409 |
| 2022/0126847 A1 | 4/2022 | Ma | |
| 2023/0315617 A1* | 10/2023 | Wang | G05B 19/058 |
| | | | 717/124 |

FOREIGN PATENT DOCUMENTS

| | | |
|---|---|---|
| CN | 113515105 A | 10/2021 |
| EP | 3982268 A2 | 4/2022 |

OTHER PUBLICATIONS

International Search Report and Written Opinion mailed on Mar. 21, 2023, received for PCT Application PCT/CN2022/122400, filed on Sep. 29, 2022, 14 pages including English Translation.

Partial Supplementary European Search Report issued Oct. 23, 2023 in corresponding European Patent Application No. 22873952.0, 14 pages.

Mehrdad Moradi et al., "Model-Implemented Hybrid Fault Injection for Simulink (Tool Demonstrations)", Jul. 2, 2019, Advances in Databases and Information Systems; [Lecture Notes in Computer Science; Lect. Notes Computer], Springer International Publishing, Cham, pp. 71-90, XP047512544, ISBN: 978-3-319-10403-4.

Extended European Search Report issued Feb. 15, 2024 in European Patent Application No. 22873952.0.

* cited by examiner

100

200

METHOD AND APPARATUS FOR TESTING CONTROL SOFTWARE BY INJECTING FAULT SIGNALS INTO A SIMULATION ENVIRONMENT, AND COMPUTER-READABLE STORAGE MEDIUM

CROSS-REFERENCE TO RELATED APPLICATION

The present application is a continuation of International Application No. PCT/CN2022/122400, filed Sep. 29, 2022, which is incorporated herein by reference in its entirety.

TECHNICAL FIELD

This application relates to the field of automation control, and in particular, to a method and apparatus for testing control software, and a computer-readable storage medium.

BACKGROUND

With the development of automation technology, higher requirements are imposed on automated control devices. An automated control device includes a series of control programs. Before the automated control device is put into practical use, the control programs in the device need to be optimized, that is, the control programs need to be simulated and debugged. However, a general simulation-based debugging process involves a lot of labor cost, resulting in low efficiency of the entire simulation-based debugging process.

SUMMARY

This application provides a method and apparatus for testing control software, and a computer-readable storage medium to reduce the time consumed in the simulation-based debugging and enhance efficiency.

According to a first aspect, a method for testing control software is provided, including: obtaining test information of a plurality of fault signals; and injecting, based on the test information of the plurality of fault signals, the plurality of fault signals into a simulation environment in sequence to obtain test results of the plurality of fault signals handled by the control software, where the simulation environment is a simulation environment of a control object of the control software.

In the technical solution of this application, by obtaining the test information of a plurality of fault signals simultaneously and then testing the fault signals in sequence, the test results of the fault signals handled by the control software are obtained. In this way, this application implements automatic testing of a plurality of fault signals in a simulation-based debugging process, reduces manual operation time in the simulation-based debugging, reduces the time consumed in the simulation-based debugging, and enhances efficiency.

In some possible implementations, the test information of the plurality of fault signals includes serial number information of the plurality of fault signals.

In the above implementations, the test information of the plurality of fault signals includes the serial number information such as a start number and an end number of the fault signals, it is convenient for the program to determine the corresponding fault signal and to inject the fault signals subsequently, thereby enhancing the efficiency of simulation-based debugging.

In some possible implementations, the test information of the plurality of fault signals includes test time of each fault signal in the plurality of fault signals. The injecting, based on the test information of the plurality of fault signals, the plurality of fault signals into a simulation environment in sequence to obtain test results of the plurality of fault signals handled by the control software, includes: injecting, for each of the plurality of fault signals, this fault signal into the simulation environment based on the test information of the fault signal; stopping the injection of the fault signal upon arrival of the test time; and obtaining a test result of the fault signal handled by the control software.

In the above implementations, the test information of a plurality of fault signals includes the test time of each fault signal. Therefore, upon arrival of the test time, the injection of the fault signals is stopped, and the corresponding test results are obtained. In this way, the test time can be set manually at discretion. The test time can be set flexibly, thereby enhancing the efficiency of simulation-based debugging.

In some possible implementations, the method further includes: starting a timer when injecting the fault signals into the simulation environment, where an expiry time of the timer is the test time, and the injection of the fault signals is stopped upon expiry of the timer.

In the above implementations, a timer is started at the start of injecting the fault signals. The injection of the fault signals is stopped upon expiry of the timer. In this way, a timer is set for the test of each fault signal, and the test of a next fault signal automatically starts upon expiry of the timer, thereby enhancing the efficiency of simulation-based debugging.

In some possible implementations, after the obtaining test results of the fault signals handled by the control software, the method further includes: restarting the simulation environment so that the simulation environment runs normally.

In the above implementations, after a test result is obtained, the simulation-based environment is restarted to make the simulation-based environment run normally, thereby providing a normal test environment for the test of the next fault signal, and enhancing the efficiency of simulation-based debugging.

In some possible implementations, the method further includes: displaying the test results of the plurality of fault signals handled by the control software.

In the above implementations, by displaying the corresponding test results, it is convenient to manually monitor the entire test process, thereby enhancing the user's experience in the simulation-based debugging process.

In some possible implementations, the method further includes: correcting control logic of the control software based on the test results of the plurality of fault signals.

In the above implementations, the control logic of the control software is corrected based on the test results, thereby not only enhancing the simulation efficiency, but also enhancing the control efficiency of the control software, and further enhancing the efficiency of automated production.

In some possible implementations, the simulation environment includes a plurality of driving logic blocks. The driving logic blocks are configured to drive the control object. The driving logic blocks are correlated with the fault signals. Upon injection of a fault signal into the simulation environment, the driving logic blocks drive, in response to the fault signal, the control object to stop running.

In the above implementations, the driving logic blocks in the simulation environment are correlated with the fault signals. Therefore, the driving logic blocks stop the operation of a virtual device during injection of a fault signal, thereby enhancing the response efficiency of the simulation environment and enhancing the efficiency of simulation-based debugging.

According to a second aspect, an apparatus for testing control software is provided, including: an obtaining module, configured to obtain test information of a plurality of fault signals; and a processing module, configured to inject, based on the test information of the plurality of fault signals, the plurality of fault signals into a simulation environment in sequence to obtain test results of the plurality of fault signals handled by the control software, where the simulation environment is a simulation environment of a control object of the control software.

In the technical solution of this application, by obtaining the test information of a plurality of fault signals simultaneously and then testing the fault signals in sequence, the test results of the fault signals handled by the control software are obtained. In this way, this application implements automatic testing of a plurality of fault signals in a simulation-based debugging process, reduces manual operation time in the simulation-based debugging, reduces the time consumed in the simulation-based debugging, and enhances efficiency.

In some possible implementations, the test information of the plurality of fault signals includes serial number information of the plurality of fault signals.

In the above implementations, the test information of the plurality of fault signals includes the serial number information such as a start number and an end number of the fault signals, it is convenient for the program to determine the corresponding fault signal and to inject the fault signals subsequently, thereby enhancing the efficiency of simulation-based debugging.

In some possible implementations, the test information of the plurality of fault signals includes test time of each fault signal in the plurality of fault signals. The processing module is configured to: inject, for each of the plurality of fault signals, this fault signal into the simulation environment based on the test information of the fault signal; stop the injection of the fault signal upon arrival of the test time; and obtain a test result of the fault signal handled by the control software.

In the above implementations, the test information of a plurality of fault signals includes the test time of each fault signal. Therefore, upon arrival of the test time, the injection of the fault signals is stopped, and the corresponding test results are obtained. In this way, the test time can be set manually at discretion. The test time can be set flexibly, thereby enhancing the efficiency of simulation-based debugging.

In some possible implementations, the processing module is further configured to: start a timer when injecting the fault signals into the simulation environment, where an expiry time of the timer is the test time, and the injection of the fault signals is stopped upon expiry of the timer.

In the above implementations, a timer is started at the start of injecting the fault signals. The injection of the fault signals is stopped upon expiry of the timer. In this way, a timer is set for the test of each fault signal, and the test of a next fault signal automatically starts upon expiry of the timer, thereby enhancing the efficiency of simulation-based debugging.

In some possible implementations, after the obtaining test results of the fault signals handled by the control software, the processing module is further configured to: restart the simulation environment so that the simulation environment runs normally.

In the above implementations, after a test result is obtained, the simulation-based environment is restarted to make the simulation-based environment run normally, thereby providing a normal test environment for the test of the next fault signal, and enhancing the efficiency of simulation-based debugging.

In some possible implementations, the apparatus further includes a displaying module. The displaying module is configured to: display the test results of the plurality of fault signals handled by the control software.

In the above implementations, by displaying the corresponding test results, it is convenient to manually monitor the entire test process, thereby enhancing the user's experience in the simulation-based debugging process.

In some possible implementations, the processing unit is further configured to: correct control logic of the control software based on the test results of the plurality of fault signals.

In the above implementations, the control logic of the control software is corrected based on the test results, thereby not only enhancing the simulation efficiency, but also enhancing the control efficiency of the control software, and further enhancing the efficiency of automated production.

In some possible implementations, the simulation environment includes a plurality of driving logic blocks. The driving logic blocks are configured to drive the control object. The driving logic blocks are correlated with the fault signals. Upon injection of a fault signal into the simulation environment, the driving logic blocks drive, in response to the fault signal, the control object to stop running.

In the above implementations, the driving logic blocks in the simulation environment are correlated with the fault signals. Therefore, the driving logic blocks stop the operation of a virtual device during injection of a fault signal, thereby enhancing the response efficiency of the simulation environment and enhancing the efficiency of simulation-based debugging.

According to a third aspect, an apparatus for testing control software is provided. The apparatus includes a processor and a memory. The memory is configured to store a program. The processor is configured to call the program from the memory and run the program to perform the method for testing control software according to the first aspect or any one possible implementation of the first aspect.

According to a fourth aspect, a computer-readable storage medium is provided, including a computer program. When executed on a computer, the computer program causes the computer to perform the method for testing control software according to the first aspect or any one possible implementation of the first aspect.

According to a fifth aspect, a computer program product that includes an instruction is provided. When executed by a computer, the instruction causes the computer to perform the method for testing control software according to the first aspect or any one possible implementation of the first aspect.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill

DETAILED DESCRIPTION OF EMBODIMENTS

Figure 1:
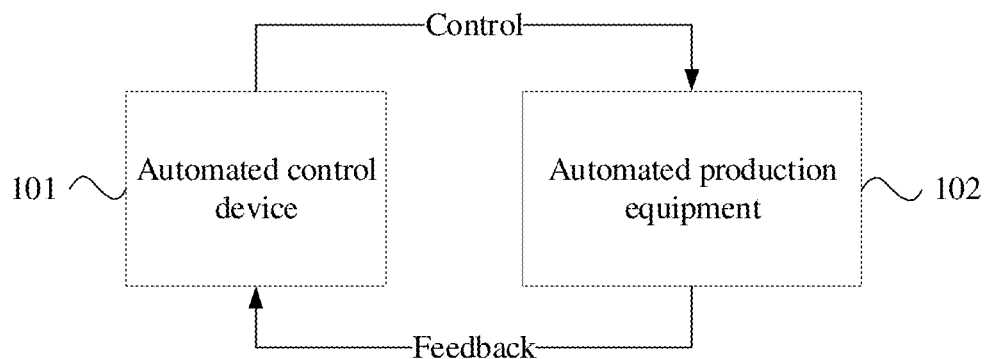
FIG. 1 is a schematic diagram of an equipment architecture of industrial automated production according to an embodiment of this application.

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned apparatus or component is necessarily located in the specified direction or constructed or operated in the specified direction. Therefore, such terms are not to be understood as a limitation on this application. In addition, the terms "first", "second", "third", and so on are merely used for descriptive purposes, but not construed as indicating or implying relative importance. "Perpendicular" does not means exact perpendicularity, but means perpendicularity falling within an error tolerance range. "Parallel" does not mean exact parallelism, but means parallelism falling within an error tolerance range.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

With the development of industrial technology, higher requirements are imposed on industrial automation to improve production efficiency. Industrial automation is a tendency to widely employ automated control and automatic adjustment apparatuses in place of manual manipulation of machines and machine systems in processing and industrial production. Under the automation conditions of industrial production, humans just indirectly take care of and supervise machines for production. Automated control means controlling a working state or parameter of a machine, equipment, or a production process to automatically run based on a preset rule by using external equipment or apparatuses without direct participation of humans. The automated control technology liberates humans from complicated, dangerous, and cumbersome labor environments and improves production efficiency significantly. For example, FIG. 1 is a schematic diagram of an equipment architecture of industrial automated production according to an embodiment of this application. As shown in FIG. 1, an equipment architecture 100 of industrial automated production includes an automated control device 101 and automated production equipment 102. The automated control device 101 controls the operation of the automated production equipment 102. The automated production equipment 102 may feed back operation status to the automated control device 101, so that the automated control device 101 can more efficiently control, based on the feedback, the automated production equipment 102 to operate.

A programmable logic controller (programmable logic controller, PLC), which is a digital operation controller containing a microprocessor and serving the purpose of automated control, can load a control instruction into a memory at any time for storage and execution. For example, the automated control device 101 in FIG. 1 may include a PLC. The programmable logic controller includes functional units such as a CPU, an instruction and data memory, an input/output interface, a power supply, and a digital-to-analog converter. Control instructions stored in the programmable logic controller may be referred to as PLC programs. Before put into use, a compiled PLC program needs to be debugged to confirm whether the program meets the requirement of machine tool controllability. Generally, a debugging process includes two steps: simulation-based debugging and online debugging.

Simulation-based debugging, also known as emulation-based debugging, is a process of debugging a PLC program under laboratory conditions by connecting simulation equipment instead of a machine tool to the control device and the like, so as to ensure correctness of the PLC program control principles, for example, correctness of the control sequence, and lay a favorable foundation for subsequent online debugging. However, for time-related mechanical actions, sequences of complex recurrent actions, and the like, online debugging is still required before the correctness of the PLC program is finally confirmed.

The PLC program may include a plurality of program modules, such as a PLC alarm program. The PLC alarm program issues an alarm and stops the operation of the equipment when the automated equipment is faulty, thereby avoiding safety accidents and the like. Therefore, the PLC alarm program also needs to be debugged or tested in the simulation-based debugging. Generally, in order to debug a PLC alarm program, an operator needs to take much time in detecting a fault signal manually in a simulation environment, trigger the fault signal forcibly and wait for the PLC alarm program to give a response. The simulation environment enters a stopped state, and then the operator cancels the fault signal manually, and sequentially presses the buttons such as Stop, Reset, and Start to run the simulation equipment again in the simulation environment. However, this simulation debugging process consumes much labor time. When the PLC alarm program includes many alarm entries, errors are prone to occur, thereby disrupting the simulation-based debugging process severely and further leading to low production efficiency.

In view of this, this application provides a method for testing control software. In this method, test information of a plurality of fault signals is input, and then the plurality of fault signals are tested one by one based on the input test information, so as to obtain test results. In this way, the test of the plurality of fault signals is implemented automatically, and it is avoided to spend much labor time on simulation-based debugging, thereby enhancing the efficiency of simulation debugging, and further enhancing the production efficiency.

It is hereby noted that, in an embodiment of this application, the control software may include a PLC program, or the control software may include other control programs, without being limited herein.

Figure 2:
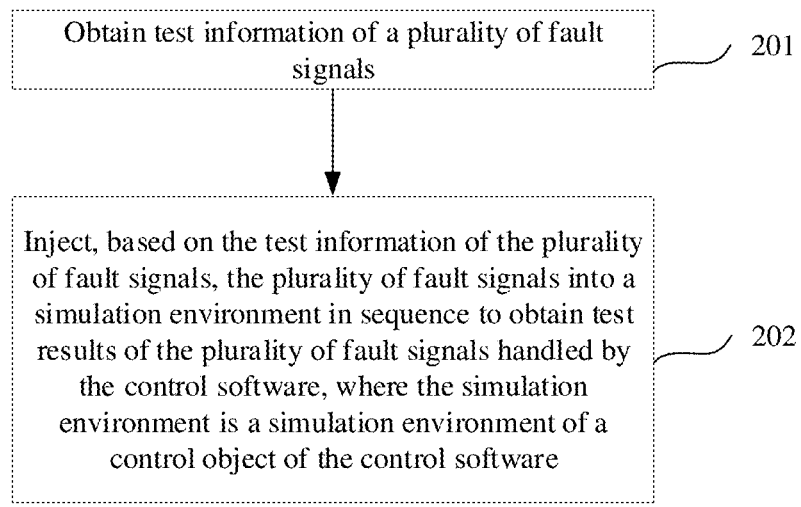
FIG. 2 is a schematic flowchart of a method for testing control software according to this application.

FIG. 2 is a schematic flowchart of a method for testing control software according to this application. The method 200 includes the following steps:

201. Obtaining test information of a plurality of fault signals.

The method provided in this embodiment of this application may be understood as: providing an automatic test function block, where the automatic test function block is configured to perform the method provided in this application. For example, for step 201, the automatic test function block may obtain test information of a plurality of fault signals. That is, the test information of the plurality of fault signals is input manually into the automatic test function block. In addition, the method provided in this embodiment of this application can automatically test a plurality of fault signals, that is, can test a plurality of alarm entries at one time. Therefore, the test information of a plurality of fault signals needs to be obtained first before the test.

202. Injecting, based on the test information of the plurality of fault signals, the plurality of fault signals into a simulation environment in sequence to obtain test results of the plurality of fault signals handled by the control software, where the simulation environment is a simulation environment of a control object of the control software.

In the method provided in this embodiment of this application, after the test information of a plurality of fault signals is obtained, the fault signals can be tested one by one. The control object of the control software may be understood as a device. In this case, the simulation environment may be understood as a simulation environment of the device, or, in other words, the simulation environment includes a virtual device, a virtual motion mechanism, and a logic block that drives the virtual motion mechanism (briefly referred to as a driving logic block). Put differently, the control software can control the device, obtain the operating status of the device, and issue an alarm when the device is faulty. Therefore, after a fault signal is injected into the simulation environment, the control software reacts in response to the change in the simulation environment. For example, the control software obtains the operating status of the virtual device, issues an alarm, or the like. The user may record the reaction of the control software as a test result of the fault signal handled by the control software.

Therefore, the method for testing control software according to this application can automatically test a plurality of fault signals during the simulation-based debugging, thereby reducing the time consumption of simulation-based debugging and enhancing the efficiency.

In step 201, a possible implementation is: the test information of the plurality of fault signals includes serial number information of the plurality of fault signals. For example, the serial number information of the plurality of fault signals is obtained through a composite function block of an automatic test function block. The serial number information includes a start number and an end number of the fault signals.

In this embodiment of this application, the test information of the plurality of fault signals may further include a test time of each of the plurality of fault signals. In this case, in step 202, a possible implementation is: injecting, for each of the plurality of fault signals, this fault signal into the simulation environment based on the test information of the fault signal; stopping the injection of the fault signal upon arrival of the test time; and obtaining a test result of the fault signal handled by the control software. It is hereby noted that the "fault signals" referred to above may be replaced by "each fault signal".

Optionally, the automatic test function block injects the fault signals into the simulation environment by using an assignment function.

In this embodiment of this application, the injection of the fault signals is stopped upon expiry of the test time of the fault signal injected into the simulation environment. For example, a timer is started at the start of injecting the fault signals into the simulation environment. An expiry time of the timer is the test time. The injection of the fault signals is stopped upon expiry of the timer.

In this embodiment of this application, after the obtaining test results of the fault signals handled by the control software, the method 200 may further include: restarting the simulation environment so that the simulation environment runs normally.

Optionally, the simulation environment may be restarted in the following way: activating the Stop, Reset, and Start buttons in sequence to restart the simulation environment. In other words, the automatic test function block may activate the Stop, Reset, and Start buttons in sequence to resume normal operation of the simulation environment.

In an embodiment of this application, the method 200 may further include: displaying the test results of the plurality of fault signals handled by the control software. Specifically, for each fault signal tested, the corresponding test result is accumulated and displayed. For example, a human-machine interface (human machine internet, HMI) monitoring interface may be created. The HMI monitoring interface includes a plurality of HMI monitoring windows. The test results are displayed in the HMI monitoring windows.

Optionally, the test results of the plurality of fault signals may be accumulated by a numerical block of the automatic test function block, and then the accumulated test results may be displayed in the HMI monitoring windows.

Optionally, after obtaining the test results of the plurality of fault signals handled by the control software, the automatic test function block determines whether the serial number of each fault signal is identical to the preset serial number of the fault signal. If the serial numbers are identical, the automatic test function block accumulates the test results.

In this embodiment of this application, the method 200 may further include: correcting control logic of the control software based on the test results of the plurality of fault signals. To be specific, based on the test result corresponding to each fault signal, it is determined whether the corresponding control logic is correct, and the control logic can be corrected accordingly.

In this embodiment of this application, the simulation environment may include a plurality of driving logic blocks. The driving logic blocks are configured to drive the control object of the control software, or in other words, the driving logic blocks are configured to drive a virtual device. The driving logic blocks are correlated with the fault signals. When a fault signal is injected into the simulation environment, a driving logic block drives, in response to the fault signal, the control object to stop operating. Therefore, under normal circumstances, when a fault signal is triggered, the driving logic block will stop the operation of the virtual device. For example, the fault signal is correlated with the condition of the driving logic block, for example, a condition not correlated with the fault signal is OPEN=Y10000, and a condition correlated with the fault signal is OPEN=Y10000 AND (NOT Alram_1).

Figure 3:
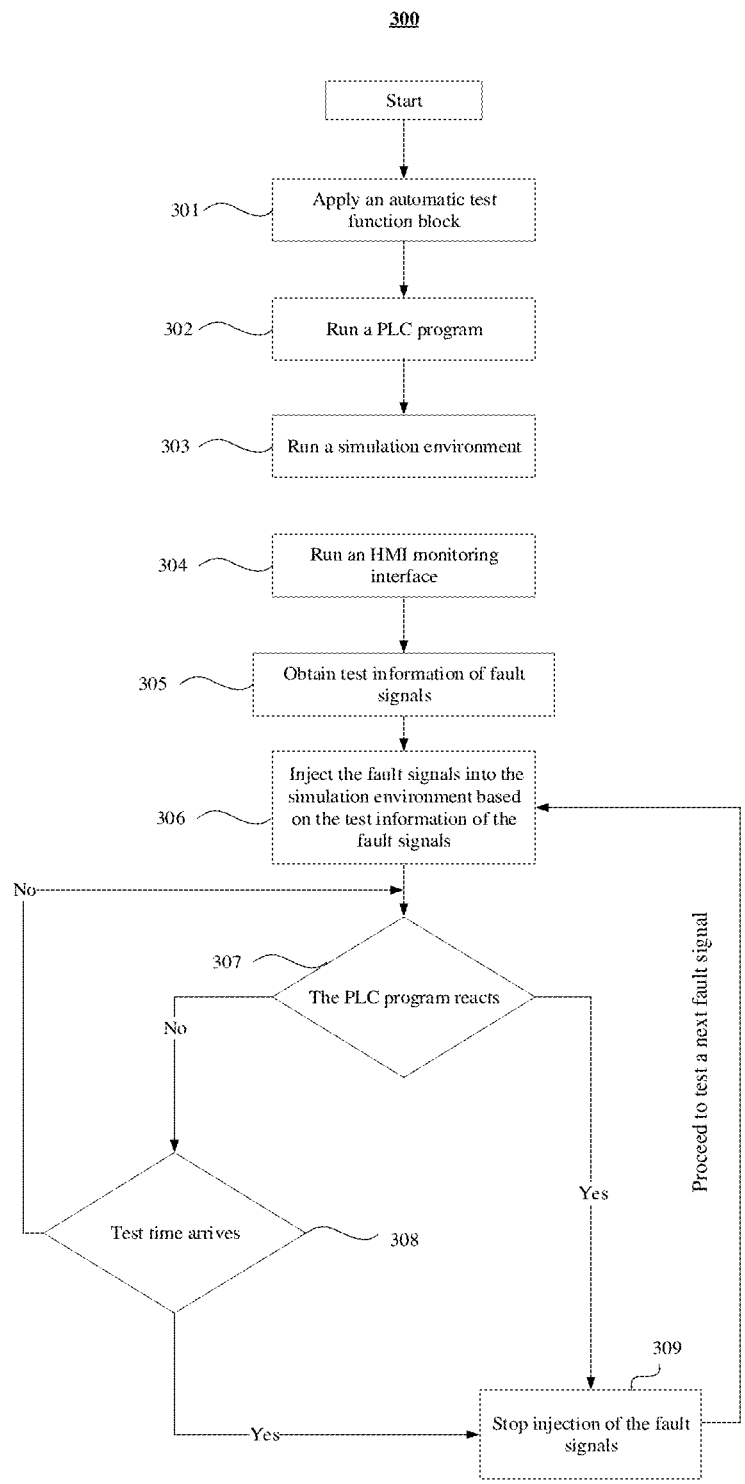
FIG. 3 is a schematic flowchart of a method for testing control software according to an embodiment of this application.

In order to further describe the method for testing control software according to this application, the following illustratively describes the method for testing control software according to an embodiment of this application with reference to FIG. 3, using an example in which the control software is a PLC program.

FIG. 3 is a schematic flowchart of a method for testing control software according to an embodiment of this application.

As shown in FIG. 3, the method 300 includes the following steps 301 to 308:

301. Applying an automatic test function block. For example, the automatic test function block may be copied and pasted into a PLC program to be tested.

302. Running a PLC program. For example, after the automatic test function block is pasted into the PLC program, the PLC program is run.

303. Running a simulation environment. For example, simulation software (such as Process Simulate) is started to run the simulation environment.

304. Running an HMI monitoring interface. For example, the monitoring software (such as EaysBulid Pro) is started to run the HMI monitoring interface.

305. Obtaining test information of fault signals. For example, the automatic test function block obtains a start number and an end number of the manually input fault signals, and the test time of each fault signal.

306. Injecting the fault signals into the simulation environment based on the test information of the fault signals. For example, the automatic test function block injects the start number and the end number of the fault signals and the test time of each fault signal into the simulation environment of the Process Simulate software.

307. Reacting, by the PLC program. For example, after a fault signal is injected into the simulation environment, a virtual device in the simulation environment enters an abnormal state, and the PLC program captures the abnormal state of the virtual device. The PLC program may successfully capture or fails to capture the abnormal state. To be specific, the PLC program capturing the abnormal state and outputting a result may be understood as the PLC program reacting.

If the PLC program does not react, the automatic test function block proceeds to step 308 to determine whether the test time has arrived. If the test time has not arrived, the automatic test function block continues waiting for the PLC program to react. If the test time has arrived, the automatic test function block stops the injection of the fault signals.

If the PLC program reacts, step 309 is performed to stop the injection of the fault signals. For example, the automatic test function block purges the fault signals.

Upon stropping of injecting the fault signal, the process proceeds to test a next fault signal, that is, steps 306 to 309 are started over.

It is hereby noted that after step 309, before the start of testing the next fault signal, the automatic test function block may activate the Stop, Reset, and Start buttons in sequence to restart the simulation environment and resume normal operation of the simulation environment.

The foregoing has described in detail the method embodiment according to an embodiment of this application. The following describes an apparatus embodiment according to an embodiment of this application. The apparatus embodiment corresponds to the method embodiment, and therefore, for the content not described in detail in the apparatus embodiment, reference may be made to the preceding method embodiment. The apparatus can implement any possible implementation in the foregoing method.

Figure 4:
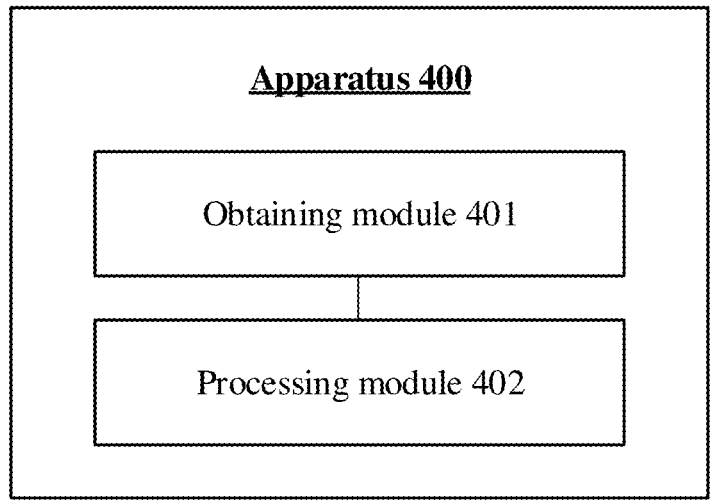
FIG. 4 is a schematic block diagram of an apparatus for testing control software according to an embodiment of this application.

FIG. 4 is a schematic block diagram of an apparatus 400 for testing control software according to an embodiment of this application. The apparatus 400 is able to perform the method for testing control software according to an embodiment of this application.

As shown in FIG. 4, the apparatus includes an obtaining module 401 and a processing module 402.

When the apparatus 400 performs the method 200, the obtaining module 401 is configured to: obtain test information of a plurality of fault signals; and the processing module 402 is configured to: inject, based on the test information of the plurality of fault signals, the plurality of fault signals into a simulation environment in sequence to obtain test results of the plurality of fault signals handled by the control software, where the simulation environment is a simulation environment of a control object of the control software.

For more detailed functions of the apparatus 400, reference may be made to the relevant description in the foregoing method embodiment, details of which are omitted here.

Figure 5:
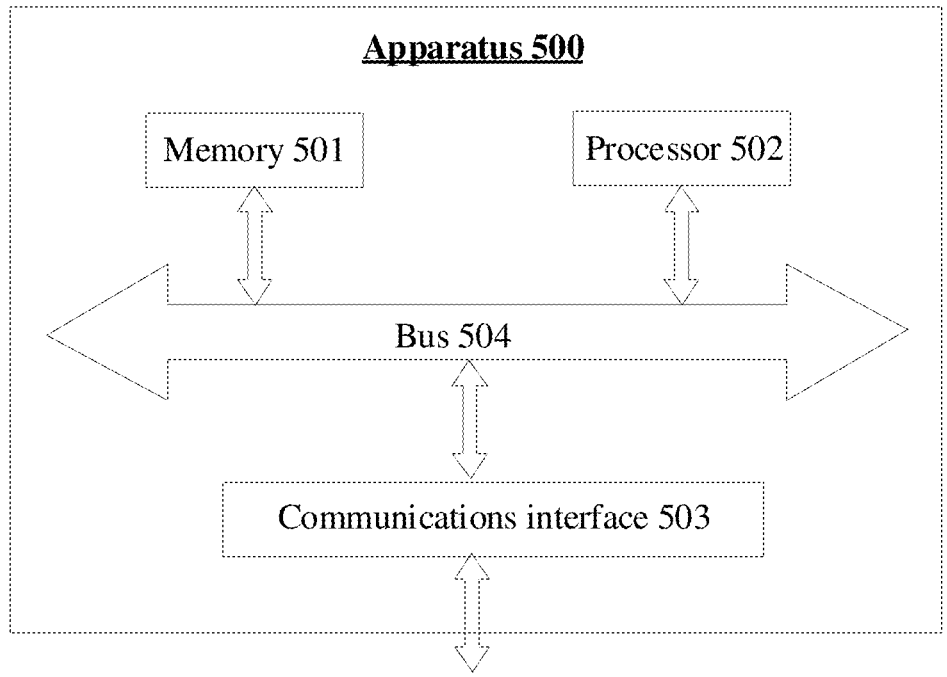
FIG. 5 is a schematic hardware structure diagram of an apparatus for testing control software according to an embodiment of this application.

FIG. 5 is a schematic hardware structure diagram of an apparatus for testing control software according to an embodiment of this application. The apparatus 500 for testing control software in FIG. 5 includes a memory 501, a processor 502, a communications interface 503, and a bus 504. The memory 501, the processor 502, and the communications interface 503 are connected to each other by the bus 504 to implement communications connection between each other.

The memory 501 may be a read-only memory (read-only memory, ROM), a static storage device, or a random access memory (random access memory, RAM). The memory 501 may store a program. When the program stored in the memory 501 is executed by the processor 502, the processor 502 and the communications interface 503 are configured to perform steps of the method for testing control software according to an embodiment of this application.

The processor 502 may be a general-purpose central processing unit (central processing unit, CPU), a microprocessor, an application specific integrated circuit (application specific integrated circuit, ASIC), a graphics processing unit (graphics processing unit, GPU), or one or more integrated circuits. The processor is configured to perform relevant programs to implement the functions of units in the apparatus for testing control software according to an embodiment of this application or perform the method for testing control software according to an embodiment of this application.

Alternatively, the processor 502 may be an integrated circuit chip capable of processing signals. In an implementation process, the steps of the method for testing control software according to an embodiment of this application may be performed by an integrated logic circuit in the hardware form or an instruction in the software form in the processor 502.

The processor 502 may be a general-purpose processor, a digital signal processor (digital signal processing, DSP), an ASIC, a field programmable gate array (field programmable gate array, FPGA), or another programmable logic device, a discrete gate, or a transistor logic device, or a discrete hardware component. The processor can implement or perform the methods, steps, and logic block diagrams disclosed in an embodiment of this application. The general-purpose processor may be a microprocessor, or the processor may be any conventional processor or the like. The steps of the method disclosed in an embodiment of this application may be directly performed by a hardware processor, or performed by a combination of hardware and software modules in the processor. A software module may be located in a mature storage medium in the art, such as a random access memory, a flash memory, a read-only memory, a programmable read-only memory, an electrically erasable programmable memory, a register, or the like. The storage medium is located in the memory 501. The processor 502 reads the information in the memory 501, and works together with hardware to perform the functions of the units included in the apparatus for testing control software according to an embodiment of this application, or perform the method for testing control software according to an embodiment of this application.

The communications interface 503 may use, but without limitation, a transmitting and receiving apparatus such as a transceiver to implement communication between the apparatus 500 and another device or a communications network. For example, traffic data of an unknown device may be obtained through the communications interface 503.

The bus 504 may include a path configured to transfer information between components (for example, memory 501, processor 502, and communications interface 503) of the apparatus 500.

It is hereby noted that although the apparatus 500 shown in the drawing includes just a memory, a processor, and a communications interface, a person skilled in the art understands that the apparatus 500 in specific implementations may include other components required for normal operation. In addition, a person skilled in the art understands that the apparatus 500 may further include a hardware component configured to implement another additional function as specifically required. Moreover, a person skilled in the art understands that the apparatus 500 may include just the components necessary to implement an embodiment of this application, but without including all components shown in FIG. 5.

An embodiment of this application further provides a computer-readable storage medium configured to store program code executable by a device. The program code includes an instruction for performing the steps in the method for testing control software.

An embodiment of this application further provides a computer program product. The computer program product includes a computer program stored on a computer-readable storage medium. The computer program includes a program instruction. When executed on a computer, the program instruction causes the computer to perform the method for testing control software.

The computer-readable storage medium may be a transitory computer-readable medium or a non-transitory computer-readable storage medium.

A person skilled in the art is clearly aware that for convenience and brevity of description, a detailed working process of the apparatus described above may be learned by referring to the corresponding process in the foregoing method embodiment, details of which are omitted here.

In the several embodiments provided in this application, it is understandable that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The terms used herein are merely used to describe an embodiment but not to limit the claims. Unless otherwise expressly specified in the context, a noun in the singular form preceded by "a", "an", or "the" used in the description of an embodiment or claims is intended to include the plural form of the noun. Similarly, the term "and/or" used herein means any and all possible combinations of one or more relevant items recited. In addition, when used in this application, the terms "include" and "comprise" mean the presence of stated features, entirety, steps, operations, elements, and/or components, but without excluding the presence or addition of one or more other features, entirety, steps, operations, elements, components, and/or any combination thereof.

The aspects, implementation manners, implementations, or features in a described embodiment can be used alone or in any combination. Each aspect of an embodiment described herein may be implemented by software, hardware, or a combination of hardware and software. The described embodiment may be embodied by a computer-readable medium that stores computer-readable code. The computer-readable code includes an instruction executable by at least one computing apparatus. The computer-readable medium may be correlated with any data storage apparatus capable of storing data that is readable by a computer system. Examples of the computer-readable media may include a read-only memory, a random-access memory, a compact disc read-only memory (Compact Disc Read-Only Memory, CD-ROM), a hard disk drive (Hard Disk Drive, HDD), a digital video disc (Digital Video Disc, DVD), magnetic tape, an optical data storage device, and the like. The computer-readable medium may be distributed in a computer system connected over a network so that the computer-readable code can be stored and executed in a distributed manner.

The foregoing technical description may be read by reference to the drawings appended hereto. The drawings form a part hereof and have illustrated the implementations in accordance with the described embodiments. Although the embodiments are described in sufficient detail to enable a person skilled in the art to implement the embodiments, the embodiments are non-restrictive so that other embodiments can be used, and changes may be made to the embodiments without departing from the scope of the described embodiments. For example, the order of operations illustrated in a flowchart is non-restrictive, and therefore, the order of two or more operations illustrated in the flowchart and described with reference to the flowchart may be changed according to several embodiments. As another example, in several embodiments, one or more operations illustrated in the flowchart and described with reference to the flowchart are optional or deletable. In addition, some steps or functions may be added to and embodiment disclosed herein, or the order between two or more steps may be permuted. All such variations are considered to be included in the disclosed embodiments and claims.

In addition, terms are used in the foregoing technical description to enable a thorough understanding of the described embodiments. However, undue detail is not required to implement the described embodiments. Therefore, the foregoing description of embodiments is rendered for purposes of interpretation and description. The embodiments rendered in the foregoing description and the examples disclosed according to such embodiments are provided separately to add a context for ease of understanding of the described embodiments. The specification described above is not intended to be exhaustive or to limit the described embodiments to a precise form of this application. Several modifications, alternatives, and variations may be made based on the foregoing teachings. In some circumstances, well-known process steps have not been described in detail in order not to unnecessarily obscure the described embodiments. Although this application has been described with reference to illustrative embodiments, various improvements may be made to the embodiments without departing from the scope of this application, and the components in this application may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A method for testing control software, comprising:
providing an automatic test function-block;
obtaining test information of a plurality of fault signals via the automatic test function block executing on a processor, the test information of the plurality of fault signals comprising serial number information of the plurality of fault signals including a start number and an end number of the fault signals; and
injecting, based on the test information of the plurality of fault signals, the plurality of fault signals into a simulation environment in sequence to obtain test results of the plurality of fault signals handled by the control software, wherein the simulation environment is a simulation environment of a control object of the control software,
wherein before starting of testing a next fault signal of each of the plurality of fault signals, the automatic test function block is configured to purge the fault signals before automatically activating Stop, Reset, and Start buttons in sequence to restart the simulation environment and resume operation of the simulation environment without fault.

2. The method according to claim 1, wherein the test information of the plurality of fault signals comprises test time of each fault signal in the plurality of fault signals; and
the injecting, based on the test information of the plurality of fault signals, the plurality of fault signals into a simulation environment in sequence to obtain test results of the plurality of fault signals handled by the control software, comprises:
injecting, for each of the plurality of fault signals, this fault signal into the simulation environment based on the test information of the fault signal;
stopping the injection of the fault signal upon arrival of the test time; and
obtaining a test result of the fault signal handled by the control software.

3. The method according to claim 2, further comprising:
starting a timer when injecting the fault signals into the simulation environment, wherein an expiry time of the timer is the test time, wherein
the injection of the fault signals is stopped upon expiry of the timer.

4. The method according to claim 1, wherein after the obtaining test results of the fault signals handled by the control software, the method further comprises:
restarting the simulation environment so that the simulation environment runs without fault.

5. The method according to claim 1, further comprising:
displaying the test results of the plurality of fault signals handled by the control software.

6. The method according to claim 1, further comprising:
correcting control logic of the control software based on the test results of the plurality of fault signals.

7. The method according to claim 1, wherein the simulation environment comprises circuitry configured to drive the control object, the circuitry is correlated with the fault signals, and, upon injection of a fault signal into the simulation environment, the circuitry drives, in response to the fault signal, the control object to stop running.

8. An apparatus for testing control software, wherein the apparatus comprises the processor and a memory, the memory is configured to store a program, and the processor is configured to call the program from the memory and run the program to perform the method according to claim 1.

9. A non-transitory computer-readable storage medium, wherein the storage medium comprises a computer program, and, when executed on a computer, the computer program causes the computer to perform the method according to claim 1.

10. An apparatus for testing control software, comprising processor configured to:
execute an automatic test function block, and obtain test information of a plurality of fault signals via the automatic test function block, the test information of the plurality of fault signals comprising serial number information of the plurality of fault signals including a start number and an end number of the fault signals; and
inject, based on the test information of the plurality of fault signals, the plurality of fault signals into a simulation environment in sequence to obtain test results of the plurality of fault signals handled by the control software, wherein the simulation environment is a simulation environment of a control object of the control software,
wherein before starting of testing a next fault signal of each of the plurality of fault signals, the automatic test function block is executed by the processor to purge the fault signals before automatically activating Stop, Reset, and Start buttons in sequence to restart the simulation environment and resume operation of the simulation environment without fault.

* * * * *